United States Patent
Girolamo et al.

(10) Patent No.: US 11,614,077 B2
(45) Date of Patent: Mar. 28, 2023

(54) WIND TURBINE BLADE FOR A WIND TURBINE AND METHOD OF MANUFACTURING A WIND TURBINE BLADE

(71) Applicant: Siemens Gamesa Renewable Energy A/S, Brande (DK)

(72) Inventors: Donato Girolamo, Voorhout (NL); Sri Markandeya Rajesh Ponnada, Aalborg (DK)

(73) Assignee: SIEMENS GAMESA RENEWABLE ENERGY A/S

( * ) Notice: Subject to any disclaimer, the term of this patent is extended or adjusted under 35 U.S.C. 154(b) by 0 days.

(21) Appl. No.: 17/237,401

(22) Filed: Apr. 22, 2021

(65) Prior Publication Data
US 2021/0332799 A1   Oct. 28, 2021

(30) Foreign Application Priority Data
Apr. 24, 2020 (EP) .................................. 20171366

(51) Int. Cl.
*F03D 80/30* (2016.01)

(52) U.S. Cl.
CPC .......... *F03D 80/30* (2016.05); *F05B 2230/90* (2013.01); *F05B 2240/30* (2013.01);
(Continued)

(58) Field of Classification Search
CPC ...... F03D 1/0675; F03D 1/0683; F03D 80/30; F05B 2230/90; F05B 2240/30; F05B 2280/6003; F05B 2280/6013
See application file for complete search history.

(56) References Cited

U.S. PATENT DOCUMENTS

| 2007/0074892 A1* | 4/2007 | Hibbard ................. H02G 13/40 |
| | | 174/117 FF |
| 2008/0073098 A1 | 3/2008 | Llorente Gonzalez et al. |

(Continued)

FOREIGN PATENT DOCUMENTS

| EP | 2267280 A2 | 12/2010 |
| EP | 2930355 A1 | 10/2015 |

(Continued)

OTHER PUBLICATIONS

M. Gagné, D Therriault: "Lightning strike protection of composites", Progress in Aerospace Sciences, vol. 64 (2013), 1-16.
(Continued)

*Primary Examiner* — Justin D Seabe
*Assistant Examiner* — Sang K Kim
(74) *Attorney, Agent, or Firm* — Schmeiser, Olsen & Watts LLP (57) ABSTRACT

Provided is a wind turbine blade for a wind turbine, the wind turbine blade including: a first element containing carbon fibers, the first element being enclosed by a first metallic cover so as to form a Faraday cage around the same; a second element containing carbon fibers, the second element being enclosed by a second metallic cover so as to form a Faraday cage around the same; and an electrical bond connecting the first metallic cover and the second metallic cover. Elements containing carbon fibers are protected against lightning strikes allowing that such elements are placed further towards the tip, thereby making the whole blade lighter and allowing to better tailor the shape of the tip.

16 Claims, 5 Drawing Sheets

(52) U.S. Cl.
CPC ................ *F05B 2280/6003* (2013.01); *F05B 2280/6013* (2013.01)

(56) References Cited

U.S. PATENT DOCUMENTS

| | | | |
|---|---|---|---|
| 2010/0329865 A1* | 12/2010 | Hibbard | .................. F03D 80/30 174/2 |
| 2012/0134826 A1 | 5/2012 | Arocena De La Rua et al. | |
| 2015/0292479 A1 | 10/2015 | Ohlerich et al. | |
| 2016/0327028 A1 | 11/2016 | March Nomen et al. | |
| 2020/0340446 A1* | 10/2020 | Girolamo | .............. F03D 1/0675 |
| 2021/0381494 A1* | 12/2021 | Aubrion | .................. F03D 80/30 |
| 2022/0018327 A1* | 1/2022 | Roberts | .................. F03D 80/30 |

FOREIGN PATENT DOCUMENTS

| | | |
|---|---|---|
| EP | 3255275 A1 | 12/2017 |
| EP | 3594494 A1 | 1/2020 |
| WO | 2005050808 A1 | 6/2005 |

OTHER PUBLICATIONS

European Search Report and Written Opinion of the European Searching Authority dated Oct. 20, 2020 for Application No. 20171366.6.

\* cited by examiner

WIND TURBINE BLADE FOR A WIND TURBINE AND METHOD OF MANUFACTURING A WIND TURBINE BLADE

CROSS-REFERENCE TO RELATED APPLICATIONS

This application claims priority to EP Application No. 20171366.6, having a filing date of Apr. 24, 2020, the entire contents of which are hereby incorporated by reference.

FIELD OF TECHNOLOGY

The following relates to a wind turbine blade for a wind turbine and a corresponding method of manufacturing a wind turbine blade.

BACKGROUND

Carbon fiber reinforced polymer (CFRP), owing to its high strength-to-mass ratio, is rapidly replacing glass fiber-based structural components to derive enhanced performance from rotor blades of wind turbines, particularly as a material for spar caps or beams.

Rotor blades of a wind turbine are frequently subjected to lightning strikes. Lightning protection of rotor blades typically relies on providing a means for interception and transfer of large lightning currents by using metallic receptors (i.e. air terminations) and internally laid cables (i.e. down-conductors to transfer lightning currents to the ground).

Since carbon fibers are electrically conductive, carbon elements can be subject to lightning strikes, which can damage their structure and consequently lead to a blade and turbine failure without warnings. In order to avoid lightning attachment, the use of carbon elements is restricted in the outermost parts (i.e. the tip region) of a wind turbine blade which negatively impacts the weight advantage and design flexibility that CFRP could have otherwise provided. For the same reasons, air terminations are avoided adjacent to carbon elements.

Moreover, CFRP spar caps extending spanwise in parallel to a metallic down-conductor behave like a set of parallel conductors with short distance and hence, when lightning is intercepted by an air termination and transferred via the down-conductor, a mutual induction will set up currents in the parallel CFRP spar caps.

In addition to that, the material properties of the down-conductor in combination with waveform parameters of lightning currents result in a potential drop along the down-conductor which is in the order of millions of volts, thereby forcing a flash-over (i.e. an electric arc) between the down-conductor and the CFRP spar caps, possibly leading to structural damage of a wind turbine blade.

To mitigate such risks, the related art proposes to provide equipotential bonds at regular intervals along the length of the CFRP spar caps. Due to the anisotropy of CFRP and differences in properties with respect to the metallic down-conductor, it is challenging to transfer current between them, thereby leading to sparking and hot-spots.

Finally, with high currents also arises the challenge of Joule heating that can cause thermal damage leading to delamination and burns, severely degrading the performance of structural elements such as spar caps.

SUMMARY

An aspect relates to provide an improved wind turbine blade which facilitates a less restricted use of carbon elements while providing sufficient protection against lightning strikes.

According to a first aspect, a wind turbine blade for a wind turbine is provided. The wind turbine blade comprises: a first element containing carbon fibers, the first element being enclosed by a first metallic cover so as to form a Faraday cage around the same; a second element containing carbon fibers, the second element being enclosed by a second metallic cover so as to form a Faraday cage around the same; and an electrical bond connecting the first metallic cover and the second metallic cover.

By forming a Faraday cage around elements containing carbon fibers, lightning current can be efficiently transferred while shielding the elements from electromagnetic fields. At the same time, by connecting the first metallic cover and the second metallic cover to each other via the electrical bond an equipotentialization between said covers is obtained. Hence, external lightning strikes may be intercepted and safely conducted via the metallic cover due to its high conductivity.

Moreover, as elements containing carbon fibers are protected, they can be placed further towards the tip of the wind turbine blade, making the wind turbine blade lighter and allowing to better tailor the shape of the tip. By limiting the metallic cover only to the elements containing carbon fibers but not to the entire blade, weight and cost savings can be achieved.

In addition, structural and lightning-associated repairs are decoupled, thus leading to fast and effective repairs, particularly since a repair of Faraday cages is relatively simple and only involves making a new layer of a metallic cover and optionally checking an electrical connection with an ohm-meter. This is the case because elements containing carbon fibers no longer act as electrical conductors in a lightning protection system circuit. Moreover, owing to the protection offered by the metallic cover, repairs can often be carried out via rope access or cranes, thereby rendering a grounding of a blade unnecessary.

An electrically isolating cover such as glass fibers may be placed between the first metallic cover and the first element, and/or an electrically isolating cover such as glass fibers may be placed between the second metallic cover and the second element. This may improve the Faraday effect obtained with respect to the respective element.

According to an embodiment, the wind turbine blade further comprises an air termination point arranged on the metallic cover and electrically connected to the same.

Since the element containing carbon fibers is protected by means of the metallic cover, it is possible to intercept lightning currents in areas of the wind turbine blade that could not be properly protected before.

According to a further embodiment, the wind turbine blade further comprises an air termination point arranged in an area of the wind turbine blade remote from the first and second element and electrically connected to the metallic cover, for example with a conductor such as a cable.

Hence, it is possible to provide air termination points e.g., towards the tip of a wind turbine blade without the need for a down-conductor running through the whole horizontal cross-section of the wind turbine blade. In the area of the elements containing carbon fibers, e.g., the spar caps, a component taking up the function of a down-conductor is rather realized by means of the metallic covers.

According to a further embodiment, the electrical bond is a metal conductor, in particular a metal cable.

A metal conductor, due to its high conductivity, provides rapid equipotentialization in case of lightning strike.

According to a further embodiment, an end portion of the first and/or second metallic cover is bundled so as to form a connection interface for the electrical bond.

In this way, an easy, efficient and safe interface with the rest of a lightning protection system can be provided, particularly since the number of additionally required components is decreased.

According to a further embodiment, the first and/or second metallic cover is at least one of a sheet, mesh, foil, paint, and coating.

The Faraday cage formed around the elements containing carbon fibers can also be formed out of multiple methods, e.g., using a mesh that bundles into a cable only at locations which serve as a connection interface for the electrical bond, while using coatings elsewhere.

The grid size of the Faraday cage can range from zero (i.e., a continuous foil) to many millimeters for a mesh, wherein different regions of an element containing carbon fibers also use meshes of different grid size. The mesh size may also be higher (i.e., larger than 1 cm), e.g. for regions having a low lightning strike probability or for regions that primarily serve for voltage equalization such as the electrical bonds connecting the first metallic cover and the second metallic cover.

According to a further embodiment, the first and/or second element containing carbon fibers is a carbon fiber reinforced polymer.

A carbon fiber reinforced polymer provides a major weight advantage and design flexibility in the design of wind turbine blades and has to be protected against lightning strikes due to its electrical conductivity.

According to a further embodiment, end portions of each of the first and second metallic cover are bundled and connected in one piece to each other so as to form the electrical bond.

Accordingly, the first and second metallic cover are integrally formed from one piece of material, e.g. a mesh, which is used for protecting the first and second elements containing carbon fibers.

According to a further embodiment, the first element is a first spar cap and/or the second element is a second spar cap.

Since spar caps are structural members and often contain carbon fibers, there is a great demand for protecting spar caps.

According to a further embodiment, the first and second spar cap extend spanwise and parallel to each other, wherein the electrical bond is the only conductor in the chordwise interspace between the first and second metallic cover.

This has the advantage that there is no need any more to position a down-conductor in between two spar caps since the metallic covers enclosing the spar caps take over the function of a down-conductor. Thus, major simplifications in design and assembly of a wind turbine blade can be achieved.

According to a further embodiment, the electrical bond is provided between spanwise end portions of the first and second metallic cover, wherein the electrical bond is electrically connected to a down-conductor of the wind turbine.

By providing the electrical bond only at a lateral end portion of a first and second metallic cover, i.e. a lateral end portion of the respective spar caps, it is not required to position any electrical connection in the chordwise space between the spar caps which results in additional constructive simplifications of the wind turbine blade.

According to a particular embodiment, the electrical connection is provided in a discontinuous manner, e.g., by providing a spark gap instead of a continuous connection.

The electrical bond provided at the lateral end portion of a first and second metallic cover may be further connected to an existing lightning protection system of a wind turbine, e.g. by means of a root terminal.

For the metallic cover, conducting materials like metals and alloys may be used as long as they pose minimal risk of galvanic corrosion (e.g., copper, bronze). As an alternative, non-metals (e.g., carbon) and/or their composites coated with metallic materials could also be used, e.g. metallized fibers.

Any embodiment of the first aspect may be combined with any embodiment of the first aspect to obtain another embodiment of the first aspect.

According to a second aspect, embodiments of the invention relate to a wind turbine comprising at least one wind turbine blade according to the first aspect.

According to a third aspect, a method of manufacturing a wind turbine blade of a wind turbine is provided. The method comprises the steps of: enclosing a first element containing carbon fibers by a first metallic cover so as to form a Faraday cage around the same; enclosing a second element containing carbon fibers by a second metallic cover so as to form a Faraday cage around the same; and connecting the first metallic cover and the second metallic cover with an electrical bond.

The embodiments and features described with reference to the apparatus of embodiments of the present invention apply mutatis mutandis to the method of embodiments of the present invention.

Further possible implementations or alternative solutions of embodiments of the invention also encompass combinations—that are not explicitly mentioned herein—of features described above or below with regard to the embodiments. The person skilled in the art may also add individual or isolated aspects and features to the most basic form of embodiments of the invention.

BRIEF DESCRIPTION

Some of the embodiments will be described in detail, with reference to the following figures, wherein like designations denote like members, wherein.

DETAILED DESCRIPTION

In the Figures, like reference numerals designate like or functionally equivalent elements, unless otherwise indicated.

Figure 1:
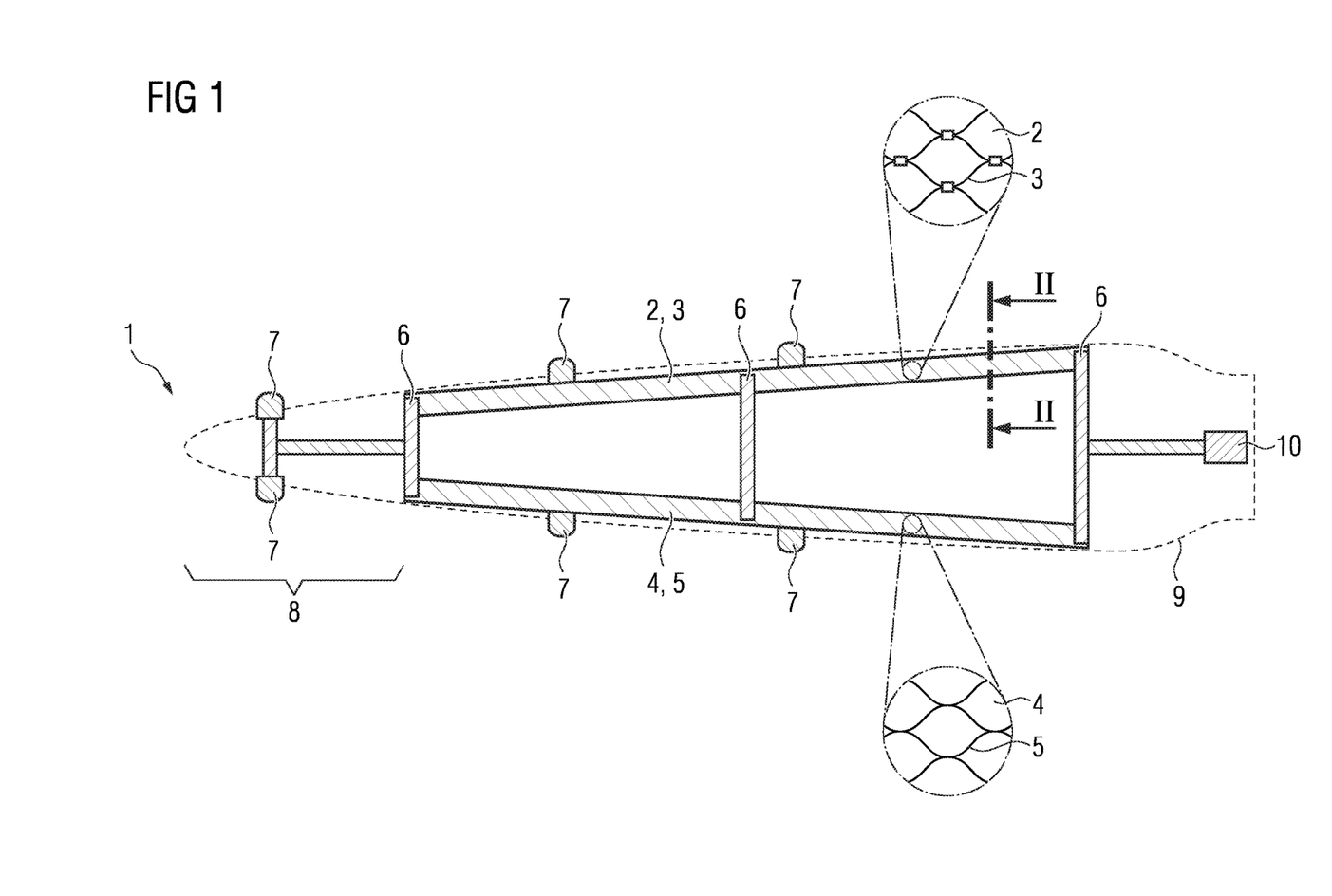
FIG. 1 shows, in a cross-sectional view, a wind turbine blade according to a first embodiment.

FIG. 1 shows a wind turbine blade 1 according to a first embodiment. The wind turbine blade 1 comprises a first element 2 containing carbon fibers, the first element 2 being enclosed by a first metallic cover 3 so as to form a Faraday cage around the same. Moreover, the wind turbine blade 1 comprises a second element 4 containing carbon fibers, the second element 4 being enclosed by a second metallic cover 5 so as to form a Faraday cage around the same as well. In the present case, the first element 2 is a first spar cap and the second element 4 is a second spar cap as well.

Furthermore, electrical bonds 6 connecting the first metallic cover 3 and the second metallic cover 5 are provided. According to the embodiment of FIG. 1, the respective metallic cover 3, 5 is a metallic mesh which is particularly apparent from the upper and lower enlarged parts of FIG. 1.

Although three electrical bonds 6 are illustrated in this embodiment, providing only two electrical bonds 6 for connecting the first metallic cover 3 and the second metallic cover 5 may also be sufficient. In detail, omitting the metallic bond 6 in an area between the spar caps will simplify the overall construction of the wind turbine blade 1.

The wind turbine blade 1 further comprises air termination points 7 arranged on the respective metallic cover 3, 5 which are electrically connected to the same. Moreover, additional air termination points 7 may be arranged in an area 8 of the wind turbine blade 1 remote from the first and second element 2, 4, i.e., the spar caps, and electrically connected to the metallic cover 3, 5. As it is apparent from FIG. 1, the respective air termination points 7 penetrate an outer layer 9 of the wind turbine blade 1 which encloses the same.

The metallic covers 3, 5, the electrical bonds 6 and the air termination points 7 create a lightning protection system for the wind turbine blade 1. In order to transfer, after a lightning strike, lightning currents to the ground, said system may be connected to a down-conductor of the wind turbine by means of a root terminal 10.

The metallic cover 3 may be provided by attaching metal wires to one another using holders, crimps, welding, soldering, binding or knotting e.g., with conducting and non-conducting materials etc. so as to form nodes of a metal net as indicated in the upper enlargement of FIG. 1. Alternatively, the metallic cover 6 may be a (e.g., woven) metallic mesh as indicated in the lower enlargement of FIG. 1 (without apparent nodes).

Figure 2:
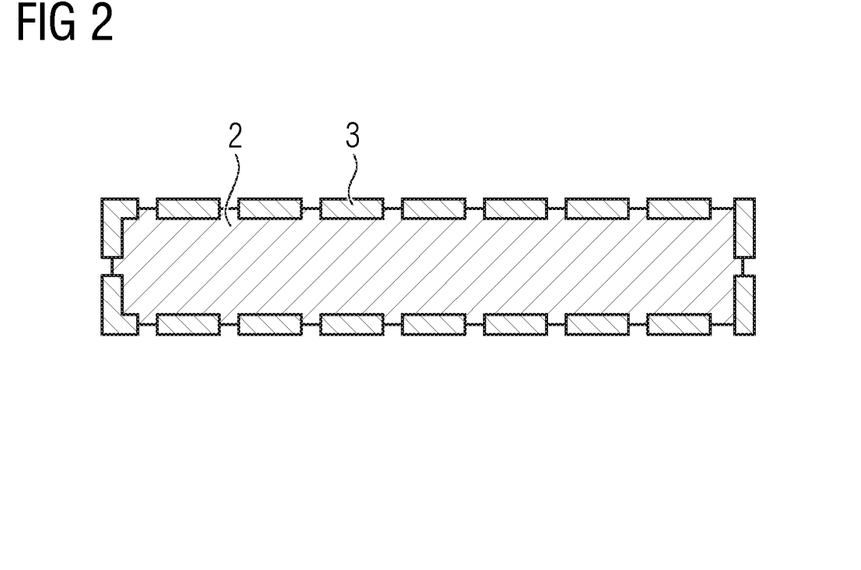
FIG. 2 shows, in a cross-sectional view, the first element containing carbon fibers of the wind turbine blade according to the first embodiment.

FIG. 2 shows, in a cross-sectional view, the first element 2 of the wind turbine blade 1 according to the first embodiment.

In the present case, the first element 2 containing carbon fibers is a spar cap which, for example, comprises a carbon fiber reinforced polymer. Since the first element 2 is enclosed by a metallic cover 3, e.g., a metal mesh, it is protected against lighting strikes. This is the case because the metallic cover 3 forms a Faraday cage around the first element 2 which serves to carry lightning currents.

Figure 3:
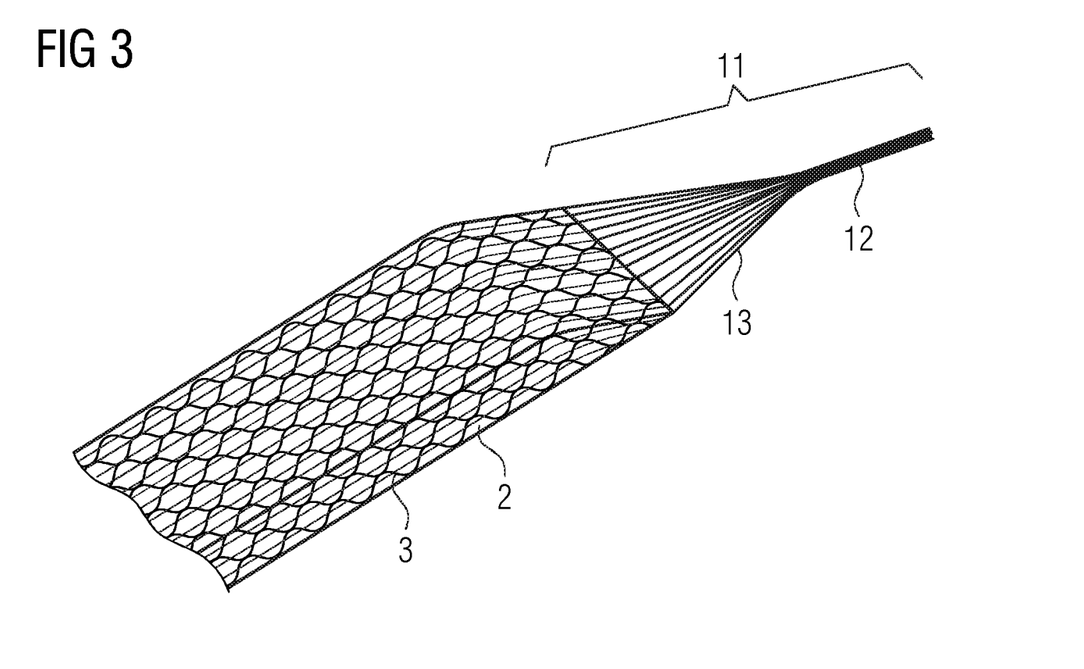
FIG. 3 shows, in a perspective view, a spar cap enclosed by a metallic cover, wherein an end portion of the metallic cover is bundled so as to form a connection interface.

FIG. 3 shows, in a perspective view, a first element 2 containing carbon fibers in form of a spar cap which is enclosed by a metallic cover 3. Therein, an end portion 11 of the metallic cover 3 is bundled so as to form a connection interface 12.

The metallic cover 3 has a transition 13 from the Faraday cage surrounding the first element 2 to the connection interface 12 that may also be referred to as a "conductive bundle". The connection interface 12 can be arranged towards the tip and/or the root of the wind turbine blade 1 which allows an easy, efficient and safe interface with the remaining components of a lightning protection system, for example using an electrical bond 6.

In case a metallic net comprising nodes (according to the upper enlargement of FIG. 1) is used as the metallic cover 3, the bundling at and end portion, i.e., root or tip of the wind turbine blade, is achieved by removing and/or undoing the metallic nodes, clamps, crimps, knots etc. from the metallic net and bundling the metal wires in a cable. Alternatively, the metallic net may be bundled with the nodes included after straightening the metallic wires.

Figure 4:
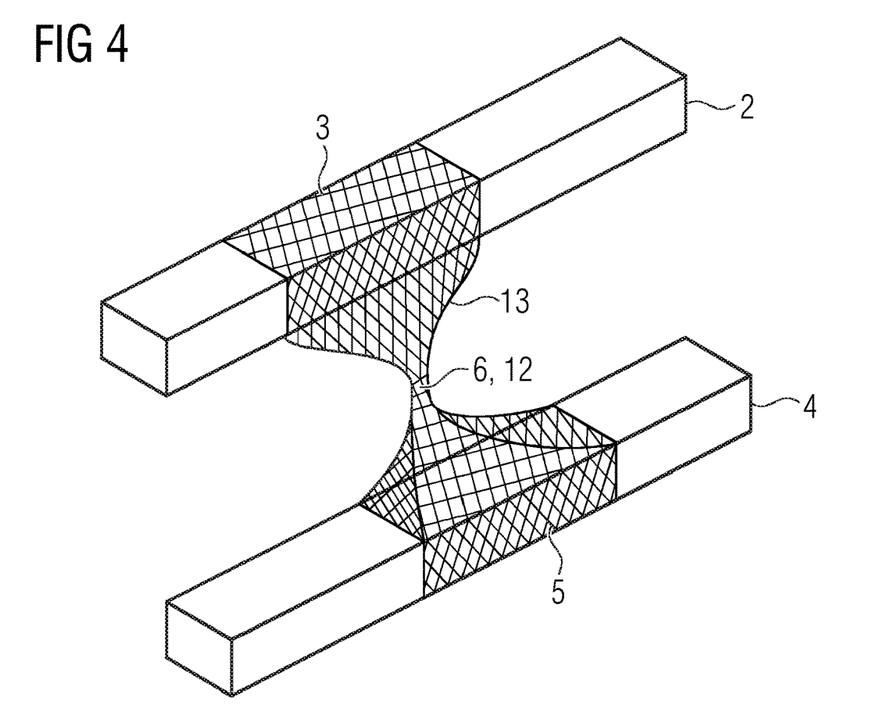
FIG. 4 shows, in a perspective view, two spar caps enclosed by metallic covers which are bundled and connected in one piece to each other so as to form an electrical bond.

FIG. 4 shows, in a perspective view, first and second elements 2, 4 containing carbon fibers, e.g., spar caps, enclosed by metallic covers 3, 5 respectively wherein the metallic cover 3 is bundled between the spar caps 2, 4 so as to form an electrical bond. Since only one piece of material is used to form a connection interface 12 for both spar caps 2, 4, the number of overall required components is decreased and hence, possible vulnerabilities can be avoided such as a loose connection. In detail, it is not required to provide additional means for connecting a first metallic cover 3 with a second metallic cover 5 any more since the electrical bond is realized by the bundled part of the metallic cover 3 as it is apparent from transition 13. In an alternate embodiment, both metallic covers 3, 5 may be used to form the connection interface 12.

In case a metallic net comprising nodes is used as the metallic cover 3, a bundling in the center of the beam may be achieved by including a third metal wire in the metallic net (or metallic nodes) or metallic mesh.

Figure 5:
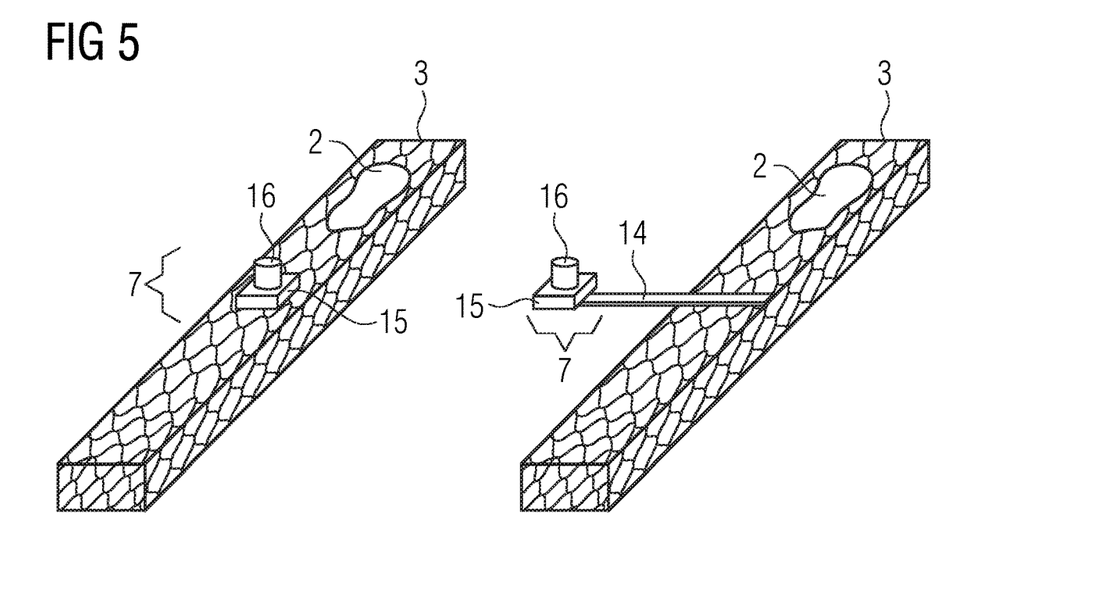
FIG. 5 shows, in a perspective view, two embodiments of a spar cap enclosed by a metallic cover, wherein the metallic cover is connected to an air termination point in different ways.

FIG. 5 shows, in a perspective view, an element 2 containing carbon fibers which is enclosed by a metallic cover 3, in a first embodiment according to which the metallic cover 3 is directly connected to an air termination point 7 and in a second embodiment according to which the metallic cover 3 is connected to an air termination point 7 using a conductor 14.

The conductor 14 may also be provided by means of a conductive bundle, by bundling and end of the metallic cover 3 so as to form the conductor 14 which is connected to a base 15 of the air termination point 7.

The embodiment illustrated on the left side of FIG. 5 shows an air termination point 7 which is directly arranged on the first element 2 containing carbon fibers such as a spar cap. In detail, a base 15 of the air termination point 7 is electrically connected to the metallic cover 3, whereas an air termination 16 of the air termination point 7 penetrates an outer layer 9 of the wind turbine blade 1 (not illustrated).

On the contrary, the embodiment shown on the right side of FIG. 5 corresponds to an air termination point 7 which is arranged in an area of the wind turbine blade 1 remote from the second element 4 and electrically connected to the metallic cover 5 using a conductor 14. The conductor 14 may be a metal cable, for example.

Figure 6:
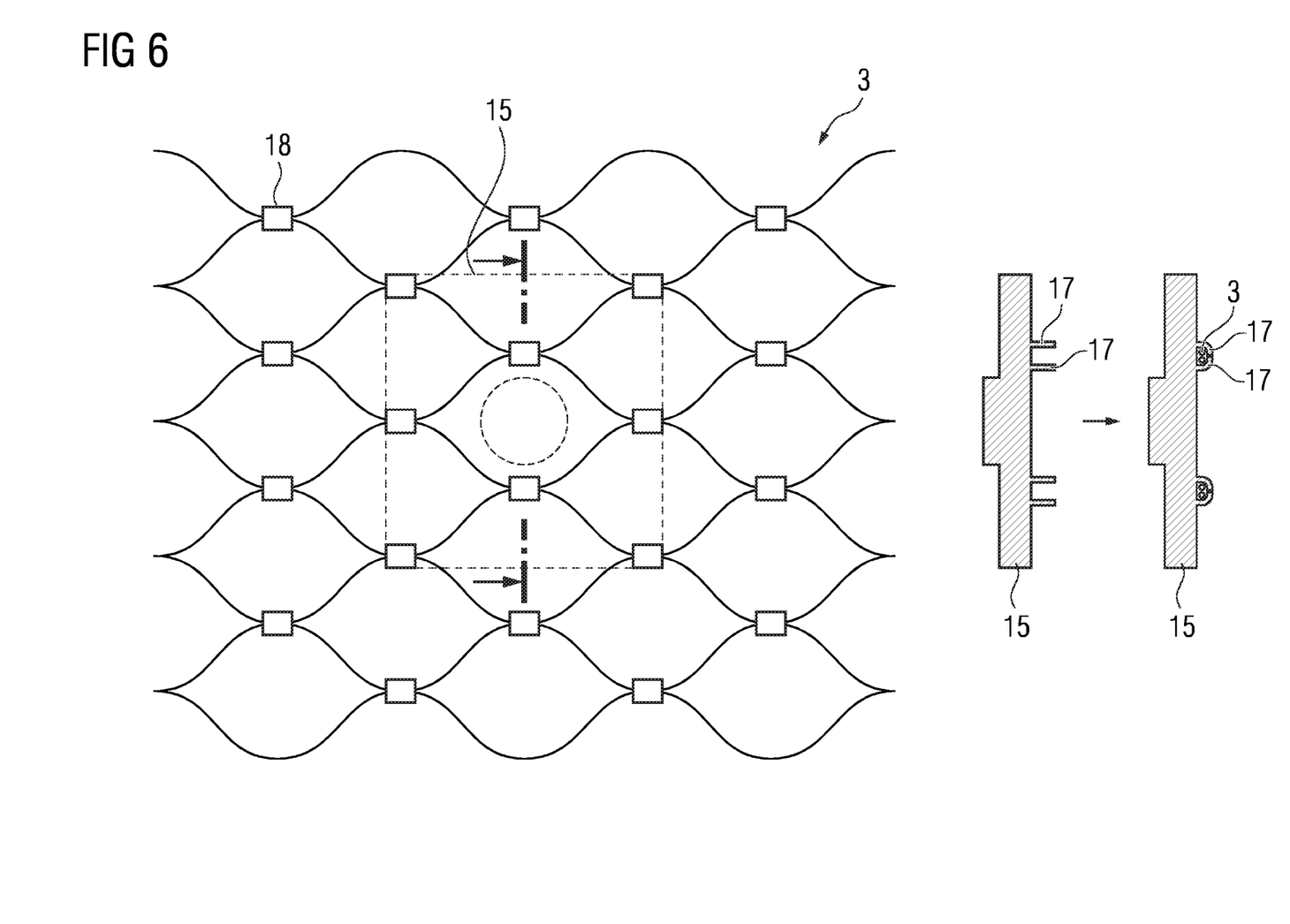
FIG. 6 shows a further embodiment of an air termination base which comprises holders by means of which the metallic cover is connected.

FIG. 6 shows a further embodiment of an air termination base 15 comprising holders 17 by means of which a metallic cover 3 is connected.

Before assembly, said holders 17 may extend perpendicularly from the bottom of the air termination base 15. After the metallic cover 3 has been inserted into the holders 17, the same are bent over to clamp or crimp the metallic cover 3. Advantageously, the holders 17 clamp or crimp the metallic cover 3 in an area where different wires of the metallic cover 3 are connected via nodes 18 which is indicated on the left side of FIG. 6.

Figure 7:
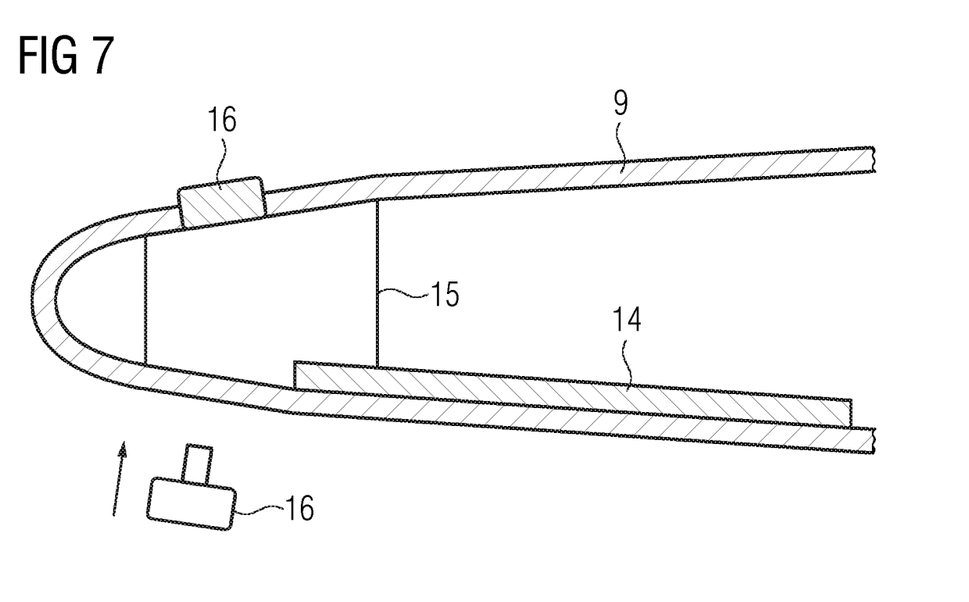
FIG. 7 shows, in a cross-sectional view, a tip portion of a wind turbine blade comprising two air terminations.

FIG. 7 shows, in a cross-sectional view, a tip portion of a wind turbine blade 1 comprising two air terminations 16. Each of the air terminations 16 penetrates an outer layer 9 of the wind turbine blade 1 which encloses the same. Said air terminations 16 are connected to an air termination base 15 which, in turn, is connected to a conductor 14. Instead of connecting the conductor 14 to a down-conductor that would extend spanwise in the wind turbine blade 1, said conductor 14 is connected to a first and/or second metallic cover 3, 5.

Figure 8:
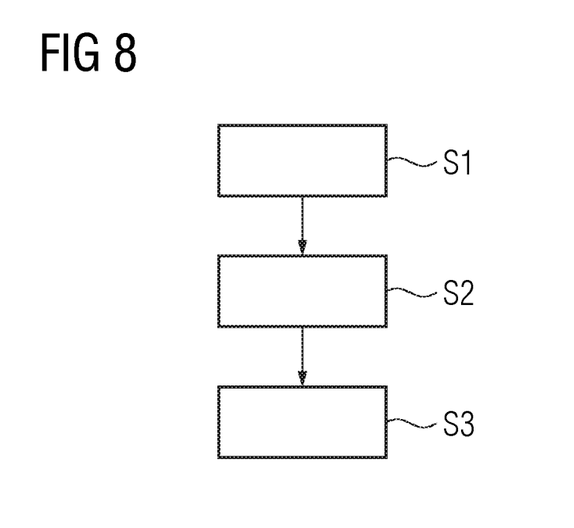
FIG. 8 shows, in a flowchart, a method of manufacturing a wind turbine blade of a wind turbine.

FIG. 8 shows a flowchart illustrating a method of manufacturing a wind turbine blade 1 of a wind turbine. In a step S1, a first element 2 containing carbon fibers is enclosed by a first metallic cover 3 so as to form a Faraday cage around the same. In a step S2, a second element 4 containing carbon fibers is enclosed by a second metallic cover 5 so as to form a Faraday cage around the same either. In a step S3, the first metallic cover 3 and the second metallic cover 5 are connected with an electrical bond 6.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A wind turbine blade for a wind turbine, the wind turbine blade comprising:
    a first element containing carbon fibers, the first element being enclosed by a first metallic cover so as to form a Faraday cage around the first element, wherein the first metallic cover extends linearly in a first direction from a first end portion of the first metallic cover to a second end portion of the first metallic cover;
    a second element containing carbon fibers, the second element being enclosed by a second metallic cover so as to form a Faraday cage around the second element, wherein the second metallic cover extends linearly in a second direction from a first end portion of the second metallic cover to a second end portion of the second metallic cover;
    a first electrical bond electrically and mechanically connecting the first end portion of the first metallic cover with the first end portion of the second metallic cover; and
    a second electrical bond electrically and mechanically connecting the second end portion of the first metallic cover with the second end portion of the second metallic cover.

2. The wind turbine blade according to claim 1, further comprising an air termination point arranged on, and in direct mechanical contact with, the first metallic cover and electrically connected to the first metallic cover, wherein an outermost layer of the wind turbine blade is on top of, and in direct mechanical contact with, the first metallic cover, and wherein the air termination point extends through the outermost layer of the wind turbine blade into a space outside the wind turbine blade.

3. The wind turbine blade according to claim 1, further comprising an air termination point arranged in an area of the wind turbine blade remote from the first and second element and electrically connected to the first metallic cover.

4. The wind turbine blade according to claim 1, wherein the first electrical bond is a metal conductor, said metal conductor being a metal cable.

5. The wind turbine blade according to claim 1, wherein the first end portion of the first and/or second metallic cover is bundled so as to form a connection interface for the first electrical bond.

6. The wind turbine blade according to claim 1, wherein the first and/or second metallic cover is at least one of a sheet, mesh, foil, paint, and coating.

7. The wind turbine blade according to claim 1, wherein the first and/or second element containing carbon fibers is a carbon fiber reinforced polymer.

8. The wind turbine blade according to claim 1, wherein the first end portions of each of the first and second metallic cover are bundled and connected in one piece to each other so as to form the electrical bond.

9. The wind turbine blade according to claim 1, wherein the first element is a first spar cap and/or the second element is a second spar cap.

10. The wind turbine blade according to claim 9, wherein the first and second spar cap extend parallel to each other, and wherein the first electrical bond is the only conductor in a chordwise interspace between the first and second metallic cover.

11. The wind turbine blade according to claim 1, wherein the first direction and the second direction are different directions.

12. The wind turbine blade according to claim 1, wherein the first electrical bond and the second electrical bond are essentially parallel to each other.

13. The wind turbine blade according to claim 1, wherein a length of the second electrical bond in a third direction oriented from the first metallic cover to the second mechanical cover exceeds a length of the first electrical bond in the third direction.

14. The wind turbine blade according to claim 1, further comprising:
    a third electrical bond electrically and mechanically connecting the first metallic cover with the second metallic cover, wherein the third electrical bond is disposed between the first electrical bond and the second electrical bond.

15. A wind turbine comprising at least one wind turbine blade according to claim 1.

16. A method of manufacturing a wind turbine blade of a wind turbine, the method comprising the steps of:
    enclosing a first element containing carbon fibers by a first metallic cover so as to form a Faraday cage around the first element, wherein the first metallic cover extends in a first direction from a first end portion of the first metallic cover to a second end portion of the first metallic cover;
    enclosing a second element containing carbon fibers by a second metallic cover so as to form a Faraday cage around the second element, wherein the second metallic cover extends in a second direction from a first end portion of the second metallic cover to a second end portion of the second metallic cover;
    electrically and mechanically connecting the first end portion of the first metallic cover with the first end portion of the second metallic cover; and electrically and mechanically connecting the second end portion of the first metallic cover with the second end portion of the second metallic cover.

\* \* \* \* \*